United States Patent
Wolfgang et al.

(10) Patent No.: US 7,519,633 B2
(45) Date of Patent: Apr. 14, 2009

(54) ASYNCHRONOUS REPLICATION OF DATA

(75) Inventors: John J Wolfgang, Winston-Salem, NC (US); Kenneth F Day, III, Tucson, AZ (US); Kenneth W Boyd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/222,900

(22) Filed: Sep. 8, 2005

(65) Prior Publication Data

US 2007/0055712 A1    Mar. 8, 2007

(51) Int. Cl.
G06F 17/30 (2006.01)
(52) U.S. Cl. .................................. 707/204; 707/201
(58) Field of Classification Search ............... 707/10, 707/201, 203, 100, 202, 204; 709/203
See application file for complete search history.

(56) References Cited

U.S. PATENT DOCUMENTS

| | | | |
|---|---|---|---|
| 4,894,847 A | 1/1990 | Tjahjadi et al. | |
| 5,758,150 A * | 5/1998 | Bell et al. | 707/10 |
| 5,781,910 A | 7/1998 | Gostanian et al. | |
| 6,298,478 B1 | 10/2001 | Nally et al. | |
| 2004/0133573 A1 | 7/2004 | Miloushev et al. | |
| 2005/0010598 A1 | 1/2005 | Shankar | |
| 2005/0025312 A1 | 2/2005 | Rijkaert et al. | |
| 2007/0112643 A1* | 5/2007 | Veres et al. | 705/26 |
| 2007/0112671 A1* | 5/2007 | Rowan | 705/39 |

FOREIGN PATENT DOCUMENTS

CN    1598778 A    3/2005

\* cited by examiner

*Primary Examiner*—Cheryl Lewis
(74) *Attorney, Agent, or Firm*—Dan Shifrin

(57) ABSTRACT

In a data processing environment, data is replicated to a remote or secondary storage device in a manner which reduces the adverse performance effects and inefficient bandwidth usage imposed by the conventional one-transaction-at-a-time process. Transactions to be transferred are grouped by a replication manager by selecting transactions having start times earlier than the completion time of a first transaction. Thus, no transaction in a group will be dependent upon any other transaction in the group. Once selected, all transactions in the group may then be transferred to the secondary storage device.

20 Claims, 6 Drawing Sheets

ASYNCHRONOUS REPLICATION OF DATA

TECHNICAL FIELD

The present invention is directed generally to the storage of digital information and, in particular, to asynchronously replicating at a secondary storage site data transactions stored at a primary storage site.

BACKGROUND ART

A typical data processing system includes one or more host computers and a data storage subsystem. Moreover, in many computing environments data integrity is important, if not necessary. Consequently, a secondary storage subsystem is provided to maintain a backup of data stored on a primary storage subsystem. It will be appreciated that the backup data must replicate as closely as possible the original data. The order in which data or "transactions" are stored may be important with certain transactions being dependent upon other, prior transactions. Thus consistency of data requires that the order of any dependent transactions be maintained during the replication. A conventional method by which consistency has been maintained is to transfer transactions to the secondary storage in the same order as they arrive from the host, waiting for each transaction to be acknowledged by the secondary site before beginning the transfer of the next transaction.

However, a one-transaction-at-a-time process has an adverse effect on the performance of the replication system, particularly as the distance increases between the replication manager and the secondary site. And, such an inefficient use of bandwidth may even become cost prohibitive.

SUMMARY OF THE INVENTION

The present invention provides a replication manager, methods, and computer program product to replicate data to a remote or secondary storage device in a manner which reduces the adverse performance effects and inefficient bandwidth usage imposed by the conventional one-transaction-at-a-time process. Transactions to be transferred are grouped by a replication manager such that no transaction is dependent upon any other transaction in the group. All transactions in the group may then be transferred to the secondary storage device.

In one embodiment, data transactions are received from one or more host devices and the times at which each transaction was started and completed are logged. The transaction having the earliest start time is identified and a group is created comprising that transaction and all other transactions having a start time which is earlier than the completion time of the identified transaction. The transactions in the group are then transferred to a storage device. Preferably, any transaction having a start time which is later than the completion time of the transaction having the earliest completion time is removed from the group before being transferred, thereby further ensuring that dependencies are avoided.

In another embodiment, a data replication manager is provided having interfaces through which data transactions are received from one or more host devices and through which the transactions are transferred to primary and secondary storage devices, a memory for storing a time at which receipt of each transaction was started and a time at which receipt of each transaction was completed and a processor operable to execute instructions. The instructions include directing the transmission of the transactions for storage in the primary storage device, identifying a transaction having the earliest start time of all received transactions, creating a group comprising the identified transaction and all other transactions having a start time which is earlier than the completion time of that transaction and directing the asynchronous transmission of the transactions in the group for storage on the secondary storage device. Preferably, the instructions further include removing from the group any transaction having a start time which is later than the completion time of the transaction having the earliest completion time of all transactions in the group, thereby further ensuring that dependencies are avoided.

In still a further embodiment, a computer program product is provided having computer-readable coded embodied therein for copying data to a secondary data storage site. The code includes instructions for receiving a plurality of data transactions from one or more host devices, logging the times at which receipt of each transaction was started and completed, identifying a first transaction having the earliest start time of all received transactions, creating a first group comprising the first transaction and all other transactions having a start time which is earlier than the completion time of the first transaction, and asynchronously transferring the transactions in the first group to a storage device. Preferably, any transaction having a start time which is later than the completion time of the transaction having the earliest completion time is removed from the group before being transferred, thereby further ensuring that dependencies are avoided.

DETAILED DESCRIPTION OF THE PREFERRED EMBODIMENT

Figure 1:
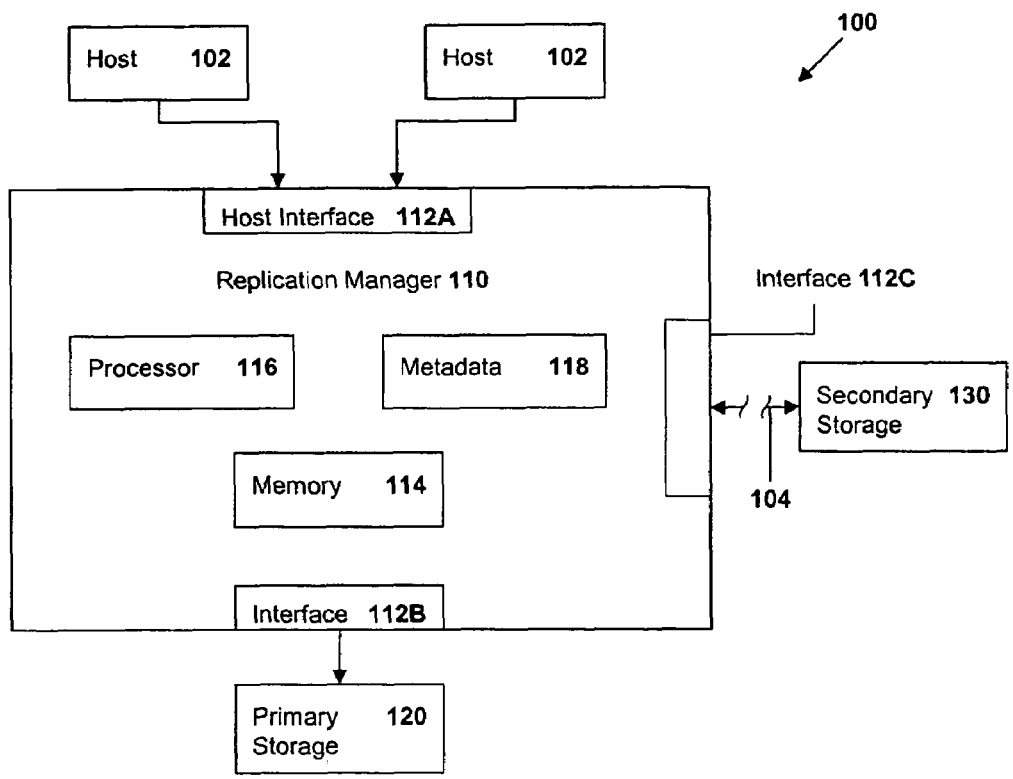
FIG. 1 is a block diagram of a data processing environment in which the present invention may be implemented.

FIG. 1 is a block diagram of a data processing environment 100 in which the present invention may be implemented. The environment includes one or most host computers or devices 102, a data replication manager 110, and primary and secondary storage devices 120 and 130. In operation, a host 102 transmits data transactions to the replication manager 110 which directs that the transactions be stored on the primary storage device 120 and a copy of the transactions be stored on the secondary storage device 130. For security and data integrity reasons, the secondary storage device 130 is preferably at a remote location relative to the replication manager 110 and the primary storage device 120 and connected to the replication manger 110 by way of a network communications link 104. The replication manager 110 may be integrated into the primary storage device 120 or may be a separate unit.

The replication manager 110 includes interfaces 112A, 112B and 112C through which it communicates and exchanges data with the host(s) 102 and the primary and secondary storage devices 120 and 130. The replication manager 110 further includes a memory 114 and a processor 116 for executing instructions stored in the memory 114. As will be described below, the replication manager 110 may also include metadata 118 which may be stored in the memory 114.

Figure 2:
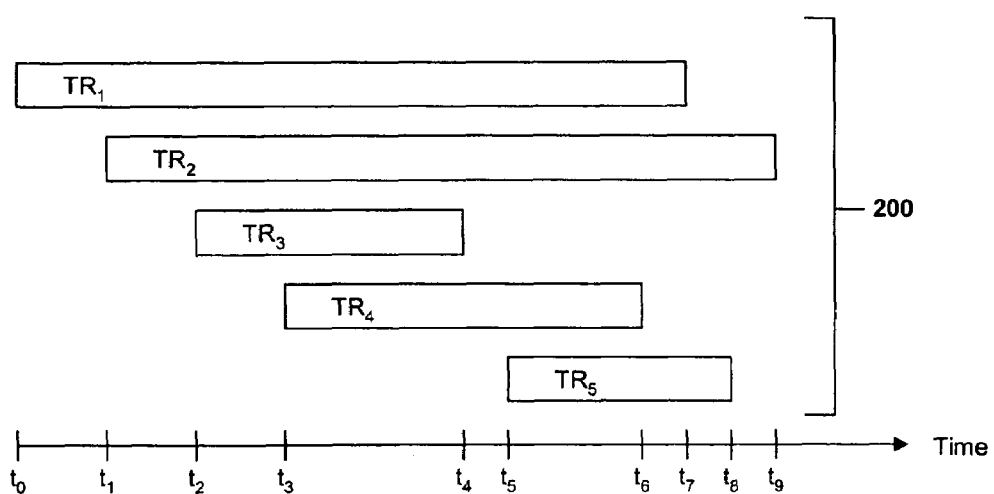
FIG. 2 is an illustration of a block of data transactions received by the replication device of the present invention.
Figure 3:
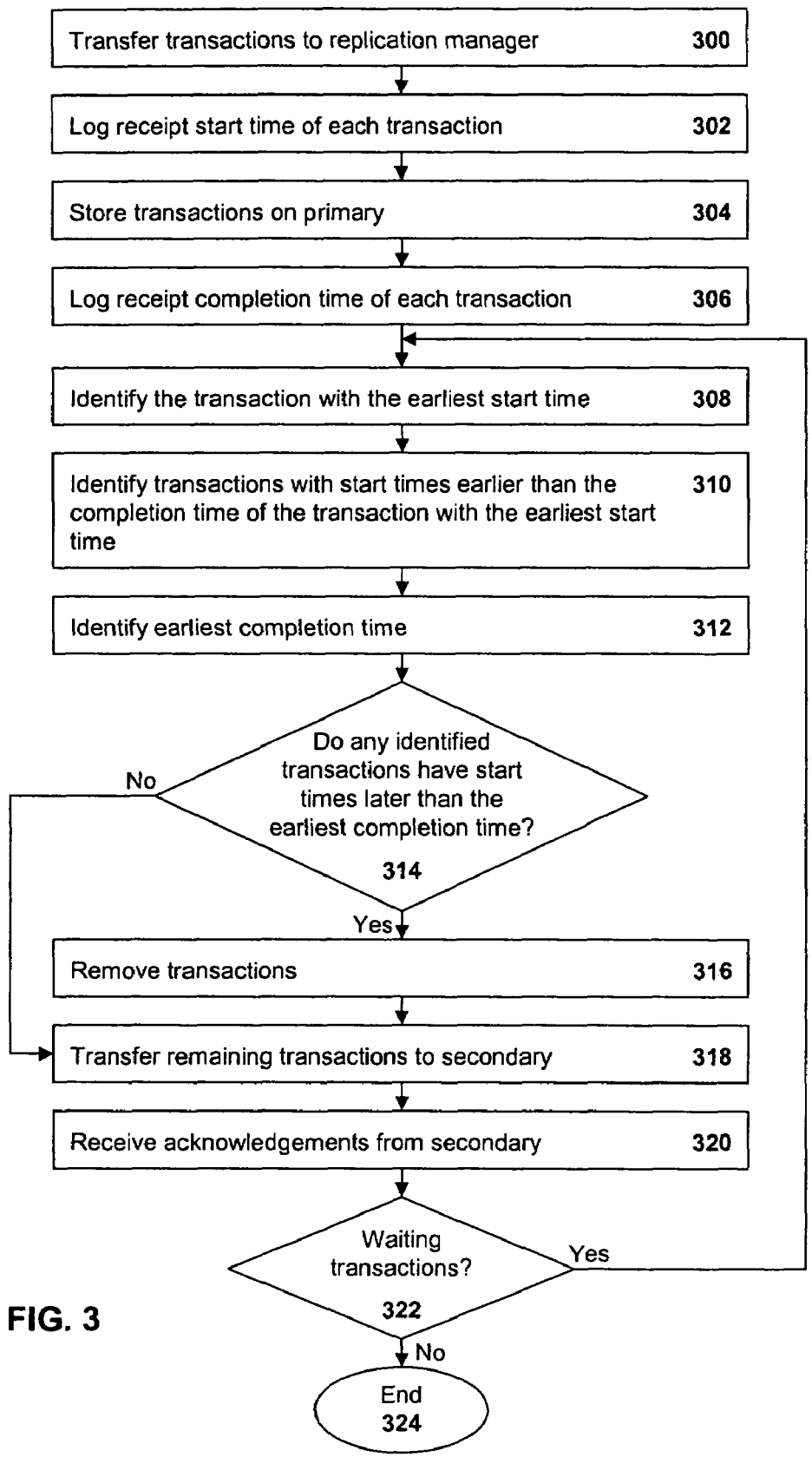
FIG. 3 is a flow chart of a method of the present invention.

Referring to FIG. 2 and the flow chart of FIG. 3, an embodiment of the present invention will be described. A block 200 of data transactions is transferred from the host(s) 102 to the replication manager 110 for storage and replication storage (step 300). Five such transactions, TR1-TR5, are shown in FIG. 2 although a larger number would typically be transferred. The replication manager 110 logs the time at which the beginning of each transaction (the "start time") is received by the replication manager 110 (step 302). After the replication manager logs the start time of each data transaction, that transaction is transferred to the primary storage device (120) for storage (step 304). When the primary storage device (120) acknowledges that it has received the data transaction, the replication manager logs the time at which each transaction was completed (the "completion time") (step 306).

Rather than transfer the data transactions TR1-TR5 to the secondary storage device 130 conventionally in the same order as they were received at the replication manager 110, they are grouped for a transfer which more efficiently takes advantage of the available bandwidth of the communications link 104. The transaction which has the earliest start time is identified (step 308), which is TR1 in FIG. 2 having start and completion times of $t_0$ and $t_7$, respectively. The replication manager 110 then identifies those of the other transactions having start times which are earlier than the completion time $t_7$ of the initially identified transaction TR1 (step 310); these transactions are TR2-TR5.

In order to validate that there are no dependencies among the transactions in the group, the replication manager 110 preferably identifies the earliest completion time of the transactions in the group (step 312). It then determines if any transaction has a start time which is later than the earliest completion time (step 314). If so, that transaction is removed from the group (step 316) and placed back onto the list of transactions waiting to be transferred to the secondary storage device 130. In FIG. 2, transaction TR3 has the earliest completion time ($t_4$) and the start time of transaction TR5 ($t_5$) occurs later; thus, transaction TR5 is removed from the group. After the transactions have been validated, the replication manager 110 initiates an asynchronous transfer of the remaining transactions through the interface 112C and over the communications link 104 to the secondary storage device 130 (step 318). That is, the replication manager 110 begins to transfer a transaction without waiting to receive an acknowledgment that the previously transferred transaction was successfully received by the secondary storage device 130. As each transaction is successfully received at the secondary storage device 130, the secondary storage device 130 sends an acknowledgement back to the replication manager 110 (step 320). When the replication manager 110 has received acknowledgments for all transactions in the group, the replication manager 110 determines if there are more transactions to be transferred (step 322). If so, the replication manager 110 repeats the process to create a new group of transactions to transfer. Otherwise, the process ends (step 324).

Figure 4:
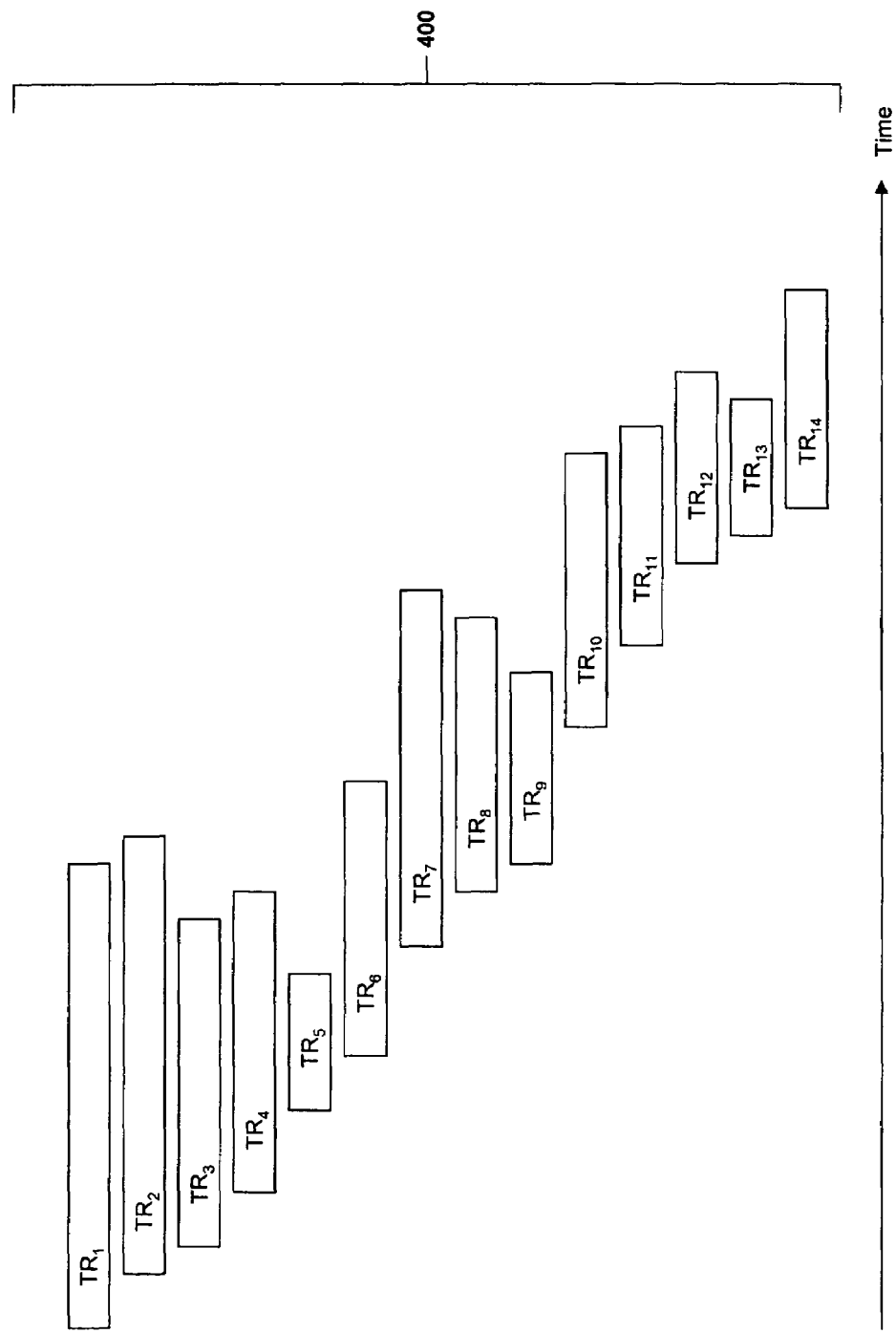
FIG. 4 is an illustration of another block of data transactions received by the replication device of the present invention.
Figure 5A:
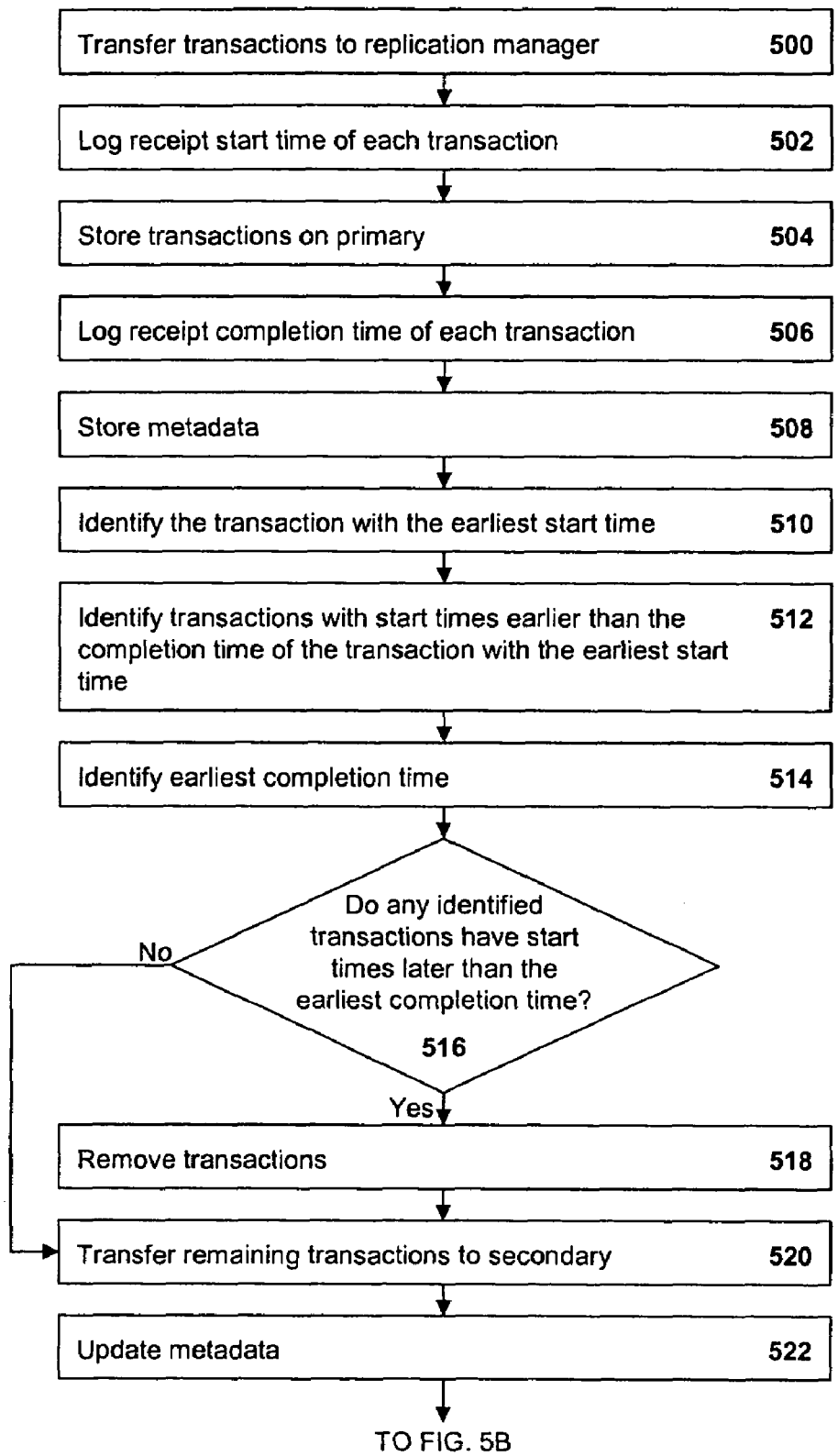
FIGS. 5A and 5B are a flow chart of an alternative method of the present invention.
Figure 5B:
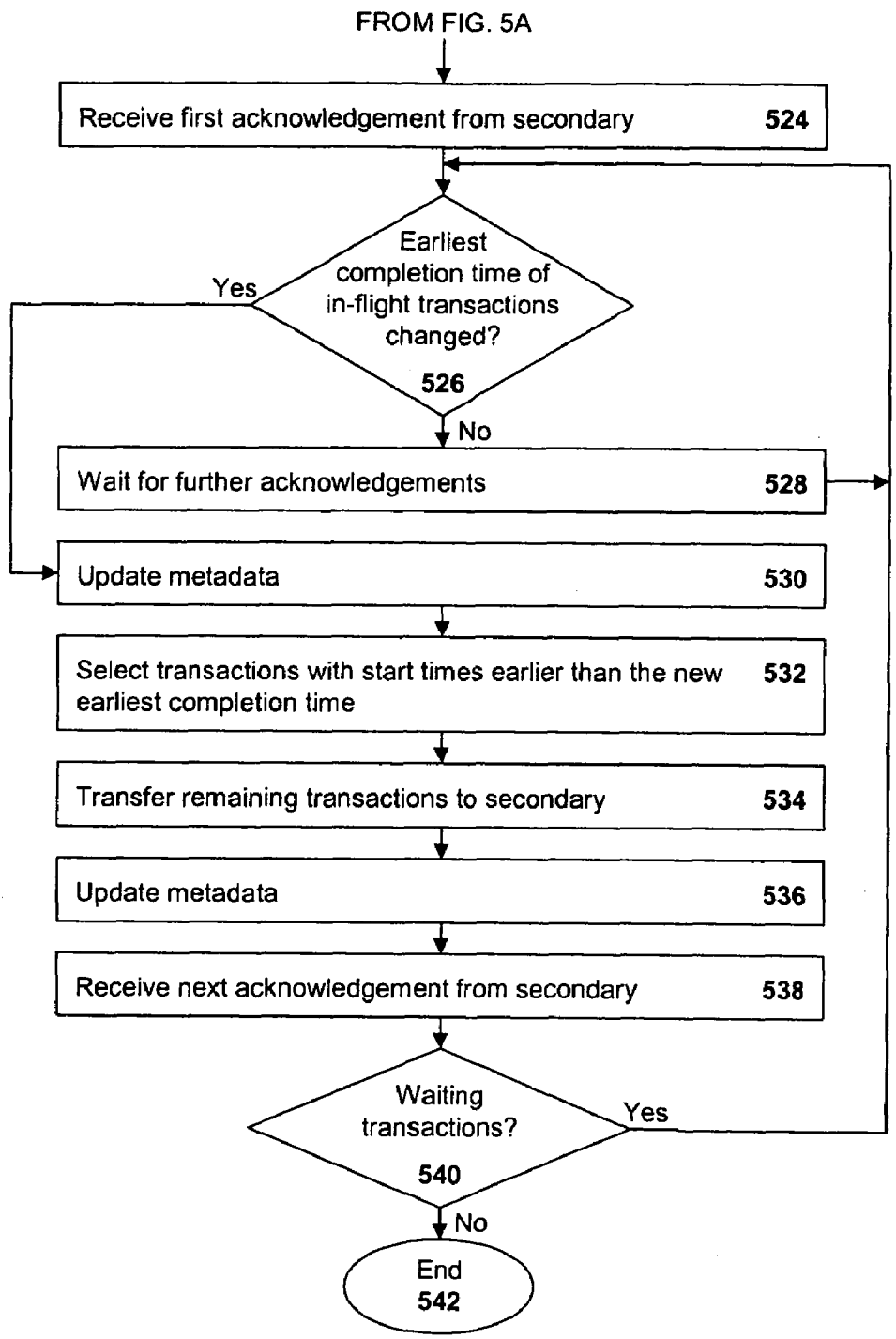

Referring now to FIG. 4 and the flowchart of FIGS. 5A and 5B, another embodiment of the present invention will be described. A block of transactions 400 is transferred from the host(s) 102 to the replication manager 110 for storage and replication storage (step 500). Fourteen such transactions, TR1-TR14, are shown in FIG. 4 although a larger number would typically be transferred. As with the embodiment of FIGS. 2 and 3, the replication manager 110 logs the start time of each transaction (step 502). The data transactions TR1-TR14 are transferred to and stored on the primary storage device 120 (step 504). The replication manager 110 then logs the completion time of each transaction (step 506) and also stores information as metadata 118 (step 508) as the transactions arrive from the host(s) and in the same order. The metadata preferably includes the starting and completion times of each of the transactions, which transactions are "in-flight" to the secondary storage 130 (none at this point), the starting and completion times of the transactions waiting to be transferred to the secondary storage 130 (all fourteen at this point), and the earliest starting time of the waiting transactions.

As with the previous embodiment, an initial group of transactions is created by identifying the earliest start time (step 510), which is TR1 in FIG. 4. From the metadata 118, the replication manager 110 then identifies those of the other transactions having start times which are earlier than the completion time of transaction TR1 (step 512); these transactions are TR2-TR8. The earliest completion time in the group is also identified (step 514), as are any transactions having a start time which is later than that time are identified (step 516). The latter transactions are removed from the group (step 518). Thus, transactions TR7 and TR8 are removed to ensure that the group does not include any possible dependencies. After the transactions in the initial group have been validated, the replication manager 110 initiates an asynchronous transfer of the remaining transactions through the interface 112C and over the communications link 104 to the secondary storage device 130 (step 520). The metadata 118 is also updated (step 522) to reflect that transactions TR1-TR6 are now in-flight, that the in-flight transaction with the earliest completion time is TR5, that transactions TR7-TR14 are waiting, and that the waiting transaction with the earliest start time is TR7.

In the previously described embodiment, a second group of transactions is created only after acknowledgements for all transaction in the initial group have been received by the replication manager 110 from the secondary storage device 130. By contrast, in the currently described embodiment a next group is created after the first acknowledgement is received back from the secondary storage device 130 (step 524). In the present example, receipt of transaction TR5 will be received by the replication manager 110 first. The remaining in-flight transactions are examined to determine if the earliest completion time of the in-flight transactions has changed (step 526). If not, the replication manager 110 waits to receive further acknowledgements (step 528). If so, the value for earliest completion time in the metadata 118 is updated to the newly determined value (step 530). The waiting transactions having a starting time that is earlier than the new earliest completion time are selected, TR7, (step 532) thus validating that there are no dependencies among transactions in the new group.

Taking further advantage of available bandwidth across the communications link 104, replication manager 110 initiates the asynchronous transfer to the secondary storage device 130 of the transactions in the new group (step 534) even as transactions in the first group remain in-flight. The replication manager 110 also updates the metadata 118 (step 536) to reflect that now transactions TR1-TR4 and TR6-TR7 are in-flight, that transaction TR3 has the earliest completion time of the in-flight transactions, that transactions TR8-TR14 are waiting and that transaction TR8 has the earliest starting time of the waiting transactions. After the replication manager 110 receives an acknowledgment of the receipt of transaction TR3 (step 538), if there are still waiting transactions (step 540), the process repeats by selecting transactions for a new group from among the waiting transactions. Otherwise, the process ends (step 542).

Figure 6:
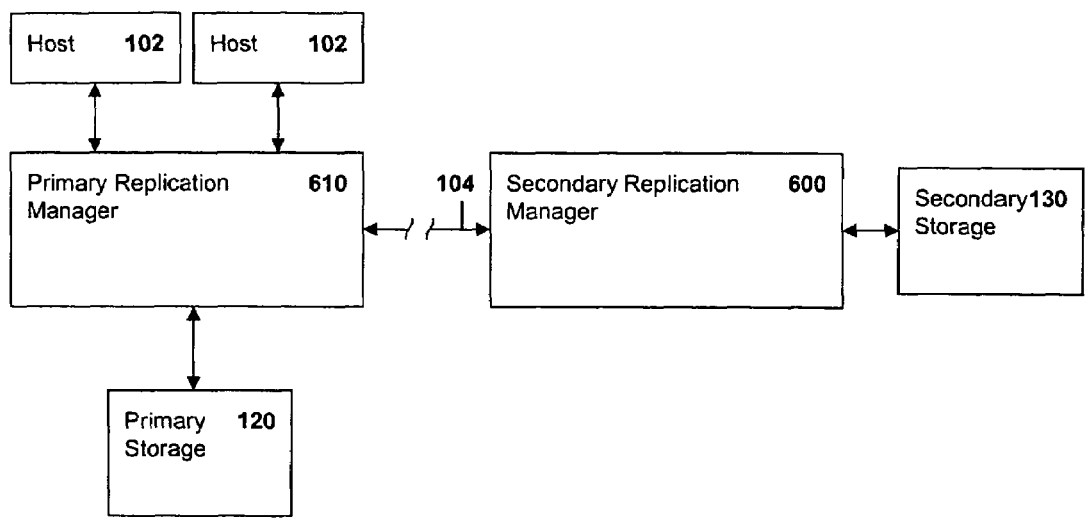
FIG. 6 illustrates an alternative configuration of a data processing environment in which the present invention may be implemented.

In an alternative configuration of the data processing environment in which the present invention may be implemented, a remote or secondary replication manager 600 (FIG. 6) is interposed between a local or primary replication manager 610 and the secondary storage device 130. The local replication manager 610 is operable to groups transactions and transfers them to the remote replication manager 600. Transaction dependencies are then eliminated by a processor, memory and metadata in the remote replication manager 600. Thus, execution of the method of the present invention may be shifted to a remote replication manager 600 from a local replication manager 610.

It is important to note that while the present invention has been described in the context of a fully functioning data processing system, those of ordinary skill in the art will appreciate that the processes of the present invention are capable of being distributed in the form of a computer readable storage medium of instructions a and that the present invention applies regardless of the particular type of storage media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for asynchronously replicating data.

What is claimed is:

1. A method for asynchronously copying data to a secondary data storage site, comprising:
    receiving a plurality of data transactions from one or more host devices for subsequent storage on a storage device at the secondary data storage site;
    logging times at which receipt of each transaction was started ("start time") and completed ("completion time");
    identifying a first transaction having the earliest start time of all received transactions;
    creating a first group comprising the first transaction and all other transactions having a start time which is earlier than the completion time of the first transaction; and
    asynchronously transferring copies of the transactions in the first group to the storage device at the secondary data storage site.

2. The method of claim 1, further comprising, before transferring the copies of the transactions in the first group, removing from the first group any transaction having a start time which is later than the completion time of the transaction having the earliest completion time of all transactions in the first group.

3. The method of claim 1, further comprising:
    receiving an acknowledgement that the transactions in the first group were successfully received by the storage device;
    selecting a second transaction, the second transaction having the earliest start time of all remaining received transactions;
    creating a second group comprising the second transaction and all other remaining transactions having a start time which is earlier than the completion time of the second transaction; and
    asynchronously transferring copies of the transactions in the second group to the storage device.

4. The method of claim 1, further comprising:
    receiving an acknowledgement that a transaction of the first group was successfully received by the storage device;
    identifying a second transaction having the earliest start time of all remaining transactions having a start time which is earlier than the earliest completion time of the transactions in the first group not yet acknowledged as being successfully received by the storage device;
    creating a second group comprising the second transaction and all other transactions having a start time which is earlier than the earliest completion time of the transactions in the first group not yet acknowledged as being successfully received by the storage device; and
    asynchronously transferring copies of the transactions in the second group to the storage device.

5. The method of claim 1, further comprising:
    before transferring the copies of the transactions in the first group, removing from the first group any transaction having a start time which is later than the completion time of the transaction having the earliest completion time of all transactions in the first group;
    receiving an acknowledgement that a transaction of the first group was successfully received by the storage device;
    identifying a second transaction having the earliest start time of all remaining transactions received from the one or more host devices having a start time which is earlier than the earliest completion time of the transactions in the first group not yet acknowledged as being successfully received by the storage device;
    creating a second group comprising the second transaction and all other transactions having a start time which is earlier than the earliest completion time of the transactions in the first group not yet acknowledged as being successfully received by the storage device; and
    asynchronously transferring conies of the transactions in the second group to the storage device.

6. The method of claim 1, wherein:
    the logging, identifying, creating and transferring are performed by a local replication manager; and
    the storage device is a remote storage device.

7. The method of claim 1, wherein:
    the logging is performed by a local replication manager;
    the identifying, creating and transferring are performed by a remote replication manager; and
    the storage device is a remote storage device.

8. A data replication manager, comprising:
    a first interface through which data transactions are received from one or more host devices for subsequent storage on a storage device at the secondary data storage site;
    a second interface through which the data transactions are transferred to a primary storage device;
    a third interface through which copies of the data transactions are transferred to a secondary storage device;

a memory for storing a time at which receipt of each transaction was started ("start time") and a time at which receipt of each transaction was completed ("completion time"); and a processor operable to execute instructions for:
   directing the transmission of the transactions through the second interface for storage in the primary storage device;
   identifying a first transaction having the earliest start time of all received transactions;
   creating a first group comprising the first transaction and all other transactions having a start time which is earlier than the completion time of the first transaction; and
   directing the asynchronous transmission of copies of the transactions in the first group through the third interface for storage on the secondary storage device.

9. The replication manager of claim 8, the processor further operable to execute instructions for, before transferring the copies of the transactions in the first group, removing from the first group any transaction having a start time which is later than the completion time of the transaction having the earliest completion time of all transactions in the first group.

10. The replication manager of claim 8, the processor further operable to execute instructions for:
   receiving an acknowledgement that the transactions in the first group were successfully received by the secondary storage device;
   selecting a second transaction, the second transaction having the earliest start time of all remaining received transactions;
   creating a second group comprising the second transaction and all other remaining transactions having a start time which is earlier than the completion time of the second transaction; and
   asynchronously transferring copies of the transactions in the second group to the secondary storage device.

11. The replication manager of claim 8, the processor further operable to execute instructions for:
   receiving an acknowledgement that a transaction of the first group was successfully received by the storage device;
   identifying a second transaction having the earliest start time of all remaining transactions having a start time which is earlier than the earliest completion time of the transactions in the first group not yet acknowledged as being successfully received by the storage device;
   creating a second group comprising the second transaction and all other transactions having a start time which is earlier than the earliest completion time of the transactions in the first group not yet acknowledged as being successfully received by the storage device; and
   asynchronously transferring copies of the transactions in the second group to the secondary storage device.

12. A computer program product of a computer readable storage medium usable with a programmable computer, the computer program product having computer-readable code embodied therein for copying data to a secondary data storage site, the computer-readable code comprising instructions for:
   receiving a plurality of data transactions from one or more host devices for subsequent storage on a storage device at the secondary data storage site;
   logging times at which receipt of each transaction was started ("start time") and completed ("completion time");
   identifying a first transaction having the earliest start time of all received transactions;
   creating a first group comprising the first transaction and all other transactions having a start time which is earlier than the completion time of the first transaction; and
   asynchronously transferring copies of the transactions in the first group to a storage device at the secondary site.

13. The computer program product of claim 12, the computer-readable code further comprising instructions for, before transferring the copies of the transactions in the first group, removing from the first group any transaction having a start time which is later than the completion time of the transaction having the earliest completion time of all transactions in the first group.

14. The computer program product of claim 12, the computer-readable code further comprising instructions for:
   receiving an acknowledgement that the transactions in the first group were successfully received by the storage device;
   selecting a second transaction, the second transaction having the earliest start time of all remaining received transactions;
   creating a second group comprising the second transaction and all other transactions having a start time which is earlier than the completion time of the second transaction; and
   asynchronously transferring copies of the transactions in the second group to the storage device.

15. The computer program product of claim 12, the computer-readable code further comprising instructions for:
   receiving an acknowledgement that a transaction of the first group was successfully received by the storage device;
   identifying a second transaction having the earliest start time of all remaining transactions having a start time which is earlier than the earliest completion time of the transactions in the first group not yet acknowledged as being successfully received by the storage device;
   creating a second group comprising the second transaction and all other remaining transactions having a start time which is earlier than the earliest completion time of the transactions in the first group not yet acknowledged as being successfully received by the storage device; and
   asynchronously transferring copies of the transactions in the second group to the storage device.

16. The computer program product of claim 12, the computer-readable code further comprising instructions for:
   before transferring the copies of the transactions in the first group, removing from the first group any transaction having a start time which is later than the completion time of the transaction having the earliest completion time of all transactions in the first group;
   receiving an acknowledgement that a transaction of the first group was successfully received by the storage device;
   identifying a second transaction having the earliest start time of all remaining transactions received from the one or more host devices;
   creating a second group comprising the second transaction and all other transactions having a start time which is earlier than the completion time of the second transaction;
   removing from the second group any transaction having a start time which is later than the completion time of the transaction having the earliest completion time of all transactions in the second group; and
   asynchronously transferring the copies of transactions in the second group to the storage device.

17. A method for copying data to a secondary data storage site, comprising:
- receiving a plurality of data transactions from one or more host devices for subsequent storage on a storage device at the secondary data storage site;
- creating a first group of transactions in which no transaction is dependent upon any other transaction in the first group; and
- asynchronously transferring conies of the transactions in the first group to a storage device at the secondary storage site.

18. The method of claim 17, further comprising:
- receiving an acknowledgement that the transactions in the first group were successfully received by the storage device;
- creating a second group of transactions in which no transaction is dependent upon any other transaction in the second group; and
- asynchronously transferring copies of the transactions in the second group to the storage device.

19. The method of claim 17, wherein:
creating and transferring are performed by a local replication manager; and
the storage device is a remote storage device.

20. The method of claim 17, wherein:
the creating and transferring are performed by a remote replication manager; and
the storage device is a remote storage device.

* * * * *